(12) United States Patent
Christo et al.

(10) Patent No.: US 10,540,472 B2
(45) Date of Patent: *Jan. 21, 2020

(54) DYNAMIC POWER INTEGRITY AND SIMULATION FOR PCB DESIGN

(71) Applicant: International Business Machines Corporation, Armonk, NY (US)

(72) Inventors: Michael A. Christo, Round Rock, TX (US); David L. Green, Austin, TX (US); Julio A. Maldonado, Austin, TX (US); Diana M. Zurovetz, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/794,633

(22) Filed: Oct. 26, 2017

(65) Prior Publication Data
US 2018/0349542 A1    Dec. 6, 2018

Related U.S. Application Data

(63) Continuation of application No. 15/612,594, filed on Jun. 2, 2017, now Pat. No. 10,303,836.

(51) Int. Cl.
  *G06F 17/50*    (2006.01)
(52) U.S. Cl.
  CPC .................... *G06F 17/5072* (2013.01)
(58) Field of Classification Search
  CPC ............ G06F 17/5072; G06F 17/5009; G06F 17/5045; G06F 2217/04; G06F 17/5068; G06F 2217/02; G06F 2217/78; G06Q 10/0875; H05K 3/0005; H05K 3/225
  See application file for complete search history.

(56) References Cited

U.S. PATENT DOCUMENTS

| 7,441,219 | B2 | 10/2008 | Perry |
| 8,492,658 | B2 | 7/2013 | Gruendler |
| 9,881,119 | B1* | 1/2018 | Kukal .............. G06F 17/5036 |
| 2003/0188267 | A1 | 10/2003 | Lehner et al. |
| 2004/0243373 | A1* | 12/2004 | Sercu .............. G06F 17/5036 703/14 |

(Continued)

FOREIGN PATENT DOCUMENTS

EP    2369509    9/2011

OTHER PUBLICATIONS

Wane et al., "Dynamic Power and Signal Integrity Analysis for Chip-Package-Board Co-Design and Co-Simulation," Proceedings of the 2nd European Wireless Technology Conference, EuWIT 2009, Feb. 2009, Rome, Italy, pp. 246-249.

(Continued)

*Primary Examiner* — Vuthe Siek
(74) *Attorney, Agent, or Firm* — VanLeeuwen & VanLeeuwen; Jason H. Sosa

(57) ABSTRACT

An approach is provided in which an information handling system creates a printed circuit board (PCB) layout based upon a set of packaged components. The information handling system modifies the PCB layout based upon an adjustment of the set of packaged components and generates board design data based on the modified PCB layout. In turn, the information handling system simulates the PCB layout using the board design data.

7 Claims, 7 Drawing Sheets

(56) References Cited

U.S. PATENT DOCUMENTS

| | | |
|---|---|---|
| 2007/0057380 A1 | 3/2007 | Katagiri et al. |
| 2008/0072182 A1 | 3/2008 | He et al. |
| 2011/0015883 A1 | 1/2011 | Yaguchi |
| 2012/0221312 A1 | 8/2012 | Dai et al. |

OTHER PUBLICATIONS

"List of IBM Patents or Patent Applications Treated as Related," Letter from Leslie A. Van Leeuwen, Oct. 26, 2017, 1 page.
Christo et al., "Dynamic Power Integrity and Simulation for PCB Design," U.S. Appl. No. 15/612,594, filed Jun. 2, 2017, 31 pages.

* cited by examiner

Information Handling System Processor and Components

US 10,540,472 B2

DYNAMIC POWER INTEGRITY AND SIMULATION FOR PCB DESIGN

BACKGROUND

A printed circuit board (PCB) electrically connects independently packaged components using conductive tracks, vias, pads, and other features etched from conductive layer copper sheets. The PCB typically includes multiple conductive layers and non-conductive layers to insulate the various conductive layers from each other. Some of the conductive layers may be designated as power layers (+/− voltages, ground) while other layers may be designated as signal layers.

Today's printed circuit boards may be designed using dedicated PCB layout software. The PCB layout software may schematically capture an electronic design through an electronic design automation (EDA) tool and determine board dimensions based on circuitry required to physically create the electronic design. Placing independently packaged component footprints onto a PCB layout is typically dynamic in nature, such as placing footprints for microprocessors, capacitors, clocks, custom devices, etc. A component footprint may be placed on a PCB layout and connections made to the component's power/ground pins. The component may then be later moved to a different position to accommodate other components, which requires another iteration of connecting power/ground pins to the component and newly added components.

BRIEF SUMMARY

According to one embodiment of the present disclosure, an approach is provided in which an information handling system creates a printed circuit board (PCB) layout based upon a set of packaged components. The information handling system modifies the PCB layout based upon an adjustment of the set of packaged components and generates board design data based on the modified PCB layout. In turn, the information handling system simulates the PCB layout using the board design data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
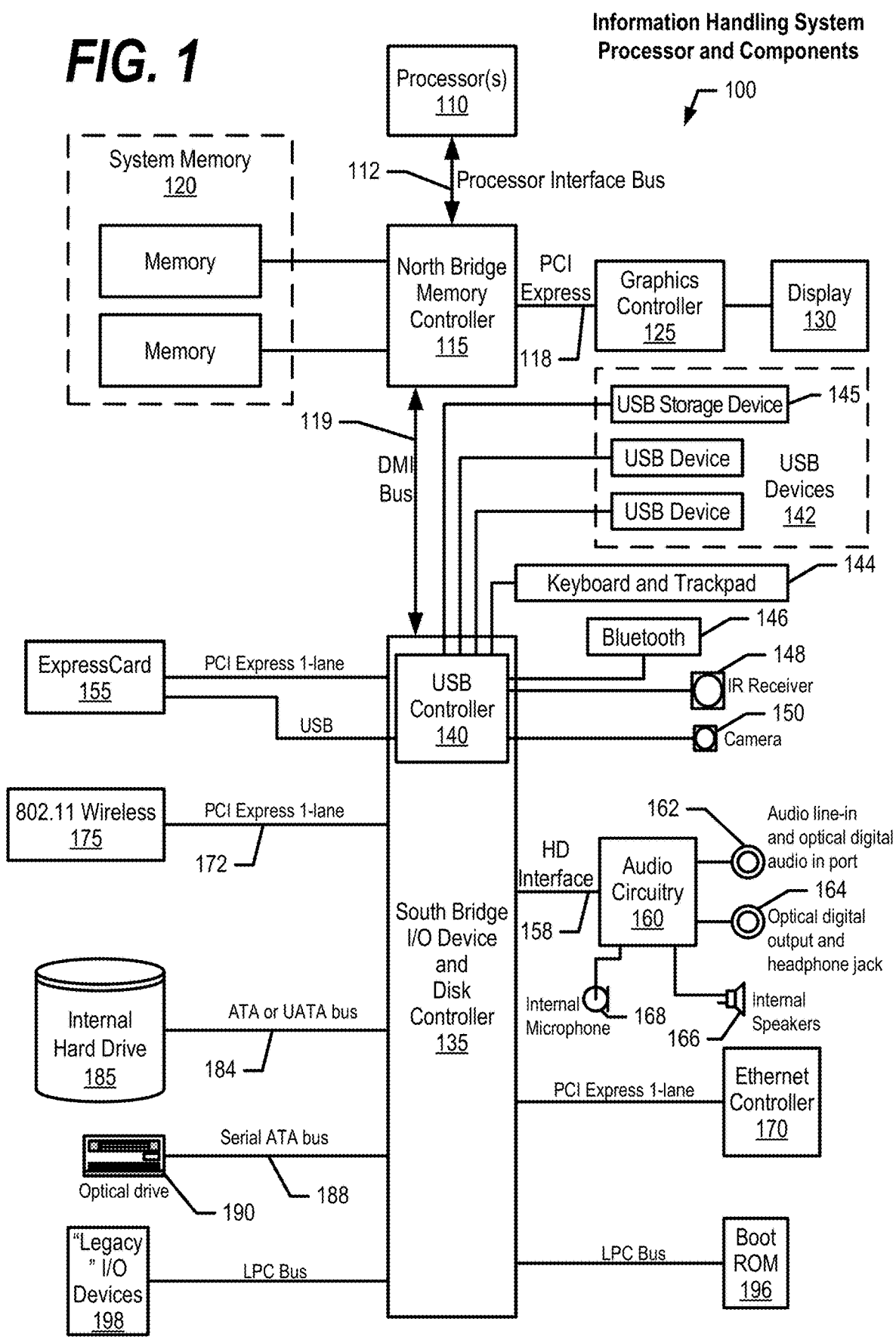
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
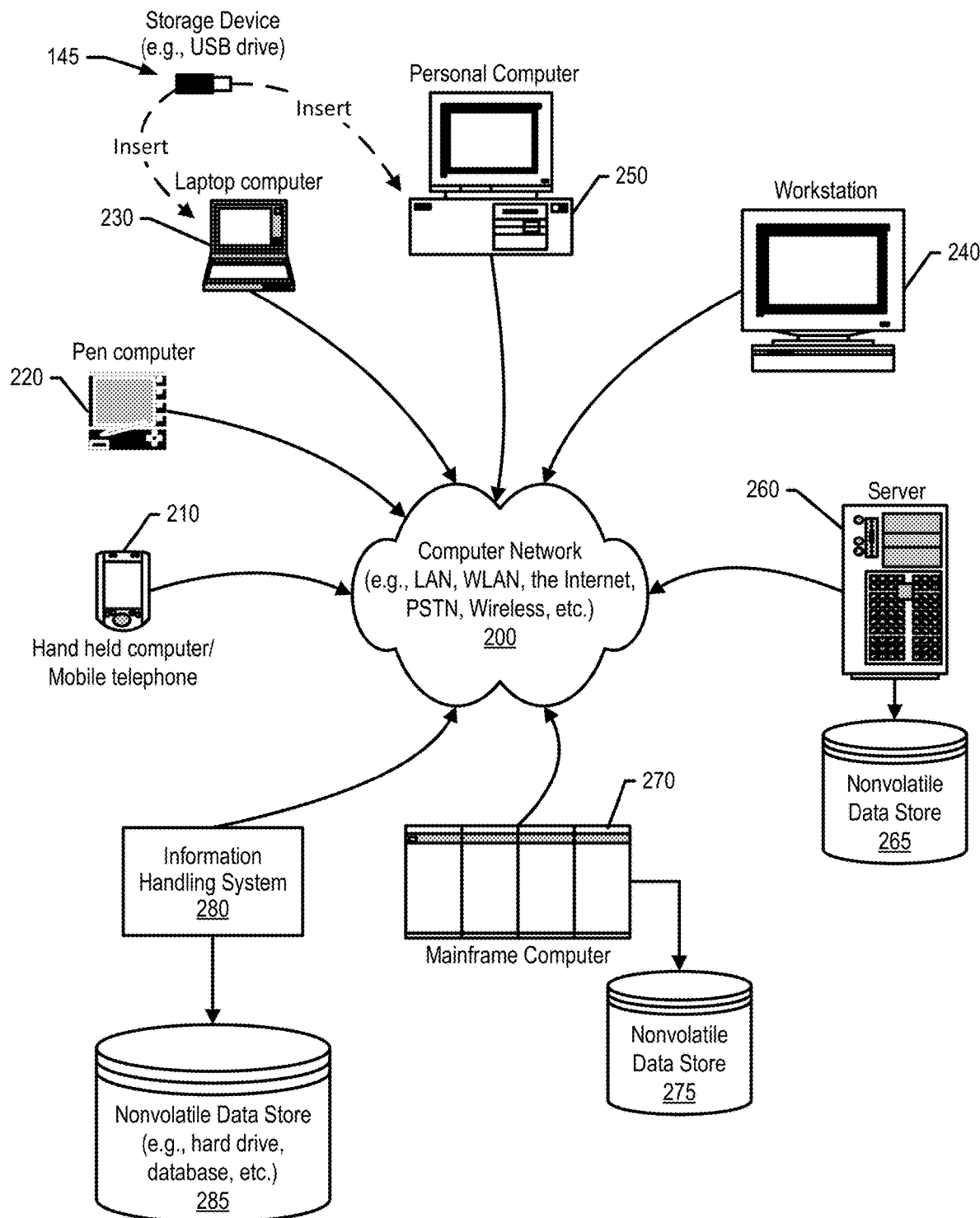
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 depict an approach that can be executed on an information handling system to dynamically design and simulate a printed circuit board. Currently, when component placement is adjusted on a PCB layout for various reasons such as to make room for other components, today's PCB layout tools keep the original power shapes intact (tracks, vias, pads, etc.). As such, when a component is moved, the power shapes that were once attached to the component are not automatically adjusted and require the PCB designer to modify or add power shapes. Also, in order to simulate the power delivery to the components, today's PCB layout tools extract board design data and provide the board design data to a separate tool to simulate the power delivery. The information handling system described herein employs an intelligent methodology that combines user input, interpreted board design data and simulation tool functionality to aid in the dynamic nature of designing power delivery in a PCB layout and also internally simulate the power delivery to the components. In so doing, the information handling system reduces PCB design cycle time and enhances the quality of the PCB end product.

Figure 3:
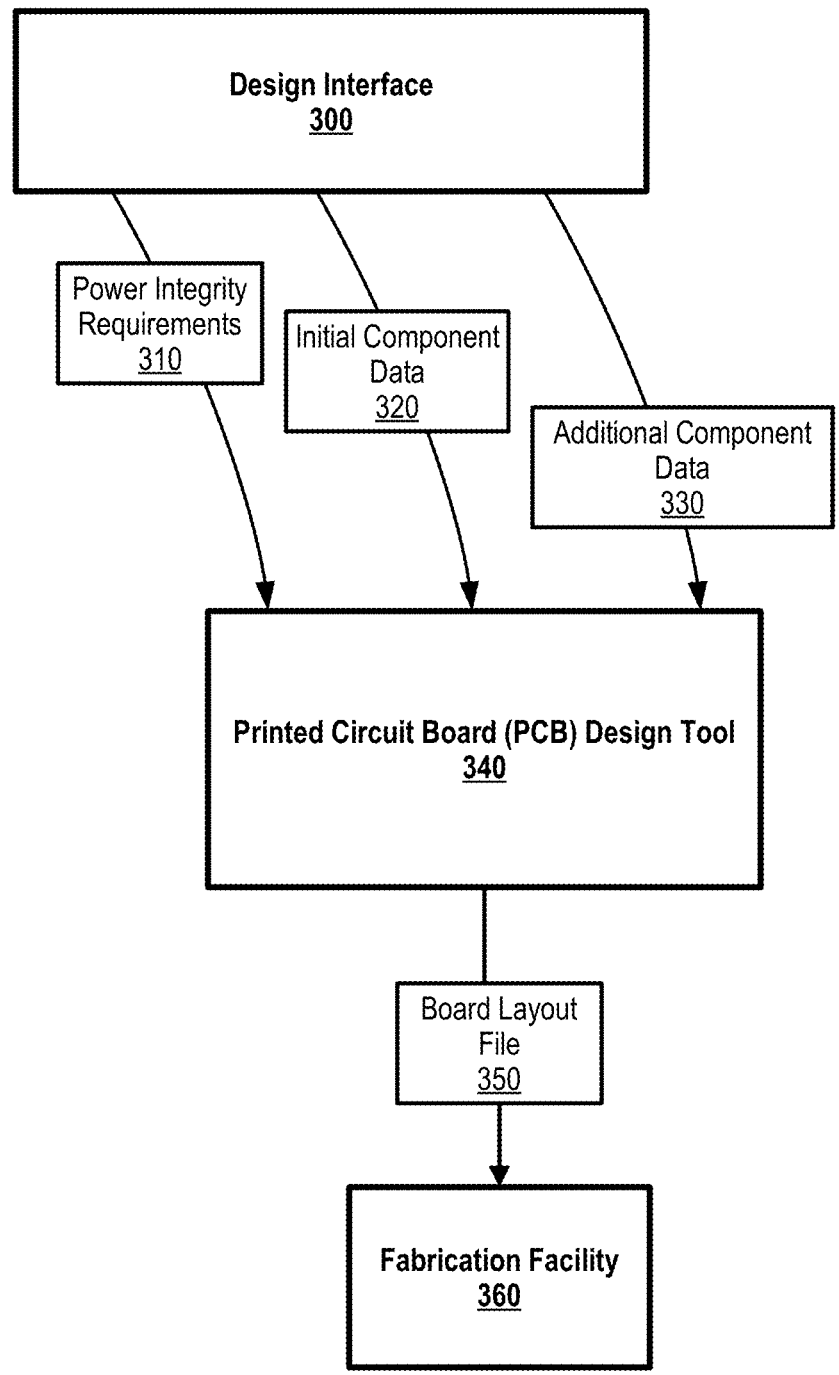
FIG. 3 is an exemplary flowchart depicting a printed circuit board design tool that dynamically designs a printed circuit board based on power integrity requirements and component placements.

FIG. 3 is an exemplary flowchart depicting a printed circuit board design tool that dynamically designs a printed circuit board based on power integrity requirements and component placements. As discussed below, PCB design tool 340 dynamically connects power shapes to components on a PCB layout, generates board design data based on the power shapes, and internally simulates the PCB layout/design using the board design data.

PCB design tool 340 receives power integrity requirements 310 from design interface 300. Power integrity requirements 310 may be, for example, voltage requirements, voltages, conductor thickness, current density, current requirements, via requirements, EMC (electromagnetic compatibility) capacitor requirements (number of capacitors/square inch), etc., which may be obtained from a user or from a design specification file.

Figure 4:
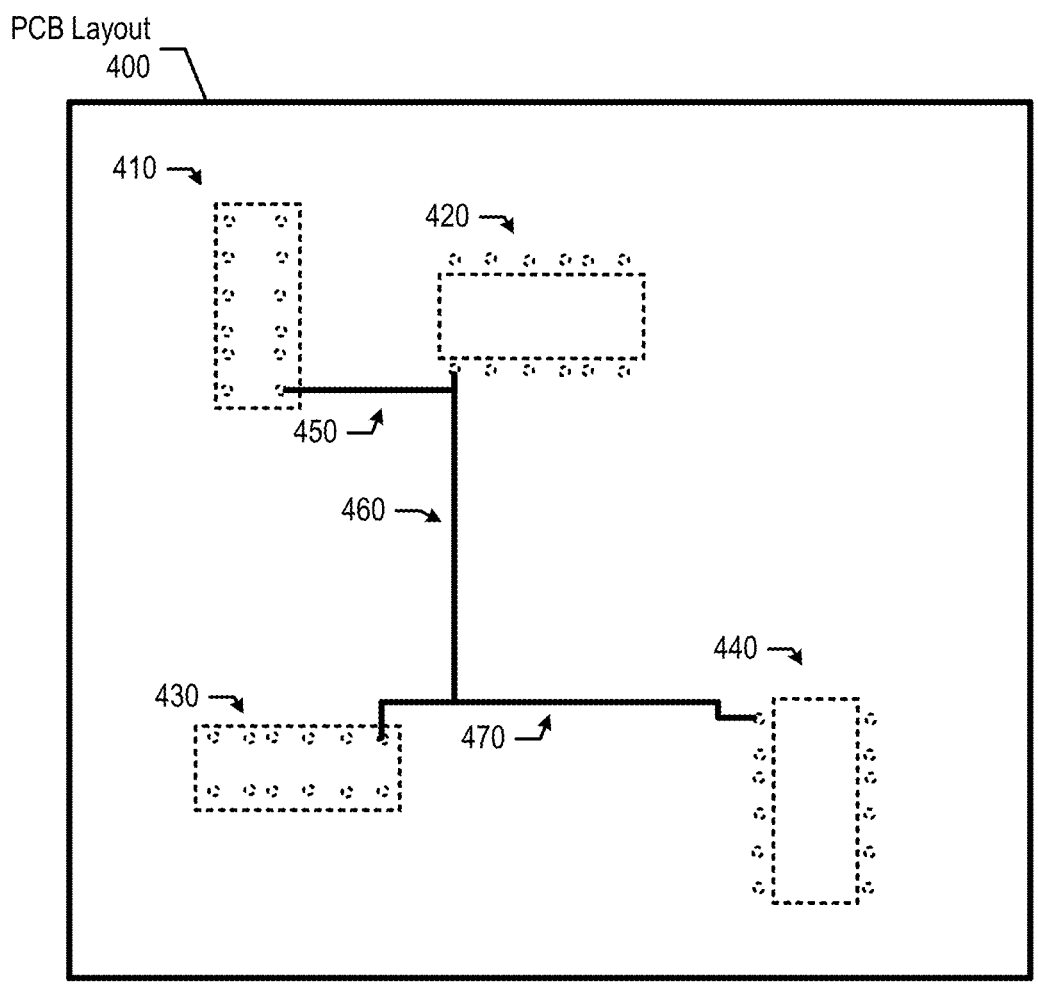
FIG. 4 is an exemplary diagram depicting a board layout that includes an initial component placement and power shape connections.

PCB design tool 340 also receives initial component data 320 from a user via design interface 300, such as component type data and placement data. Referring to FIG. 4, the user may place components 410, 420, 430, and 440 onto PCB layout 400. PCB design tool 340 evaluates power requirements of the initially placed components, such as which pins require power and ground, and the amount of anticipated current requirements. In turn, PCB design tool 340 adds power shapes (tracks) to the board layout to connect the power pins accordingly (e.g., shapes 450, 460, and 470 in FIG. 4).

Figure 5:
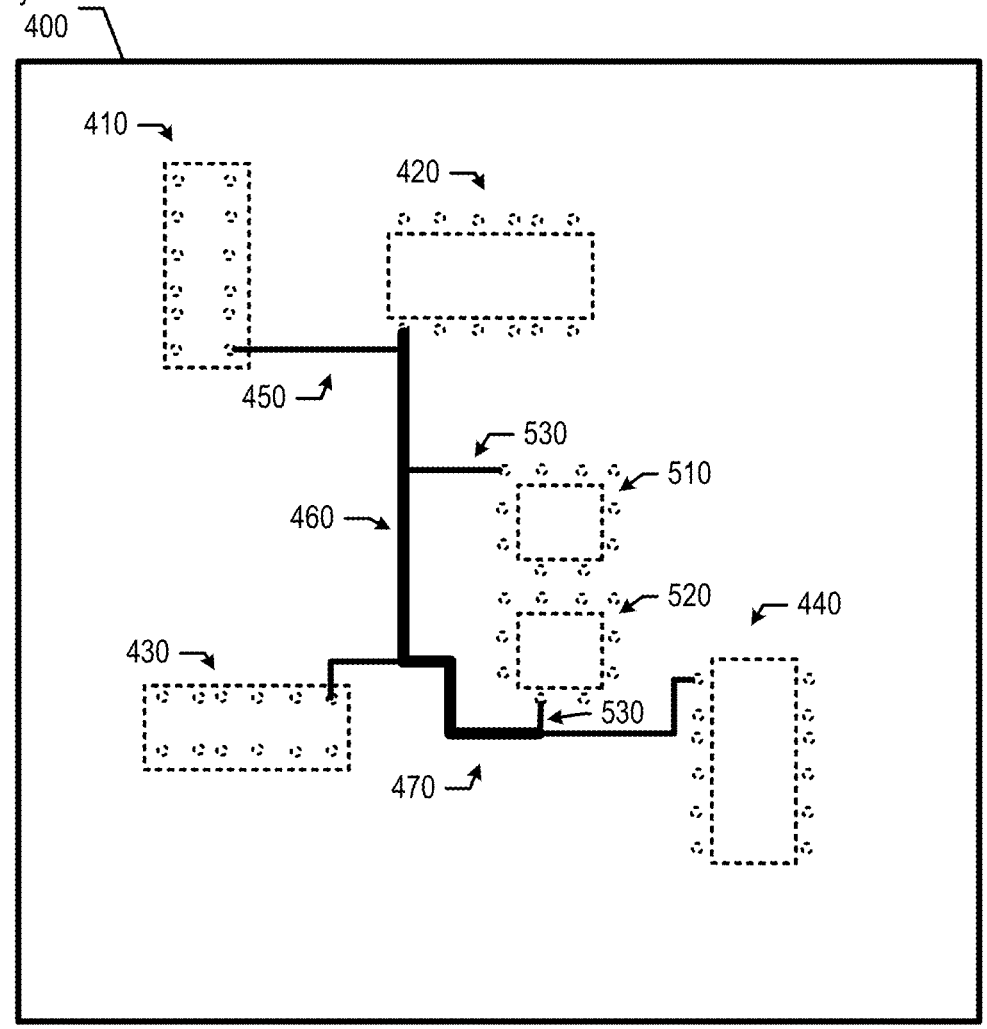
FIG. 5 is an exemplary diagram depicting a board layout that includes additional components.

Many times a board designer will add components after the initial component layout, or the board designer may initially place larger components and then realize that the initially placed components need to move to free up space of other components. As such, PCB design tool 340 receives additional component data 330, which correspond to additional components to place on the board layout. Referring to FIG. 5, the user may place components 510 and 520 onto PCB layout 400 subsequent to power shapes 450, 460, and 470 being placed on PCB layout 400.

PCB design tool 340 evaluates the newly placed components and adjusts power shapes accordingly. This may include increasing the thickness of existing shapes to accommodate increased current requirements, moving previously laid shapes to accommodate the newly placed components, and adding shapes to connect the power pins of the new components (see FIG. 5 and corresponding text for further details).

When requested, PCB design tool 340 generates board design data that is used to simulate the power delivery of the PCB board to ensure that each component receives the proper voltages and current. In turn, when the PCB layout meets power integrity requirements and design requirements, PCB design tool 340 creates board layout file 350 that fabrication facility 360 uses to create the physical PCB board.

FIG. 4 is an exemplary diagram depicting a board layout that includes an initial component placement and power shape connections. As discussed herein, PCB design tool 340 uses PCB cross-section information to determine which layers are available for voltages and a user may designate specific layers of the available layers for power shapes. For example, PCB design tool 340 may determine that layers 3, 6, and 9 are available for voltages and the user selects layers 6 and 9 for power shapes. In one embodiment, PCB design tool 340 automatically selects the power layers from the available layers.

The user also specifies power integrity requirements such as voltages (2.5V 6V, 12V, etc.), conductor thicknesses, current densities (electric current per unit area of cross section), current requirements from a power design and power integrity engineers, via requirements (number of vias, via type/size based on current carrying capacity, etc.), and EMC capacitor requirements (e.g., number of capacitors per square inch, capacitance rating, and voltage rating). In one embodiment, some voltage shapes may require a specific copper thickness, X, which is found on certain layers. As such, power planes with a thickness of X may be placed on the certain layers in the stack with a corresponding X thickness. Other power shapes that have a thickness of Y (Y<X) may be placed on cross section layers with a thickness of Y or X and may have more freedom in placement because of this.

FIG. 4 shows that components (component footprints) 410, 420, 430, and 440 are placed on PCB layout 400 and PCB design tool 340. In turn, in one embodiment, PCB design tool 340 initiates a shape development program. The shape development program analyzes the user defined power integrity requirements and component placements, and determines optimal power shapes to feed power to the placed components and to meet power integrity requirements. FIG. 4 shows that the shape development program creates shapes 450, 460, and 470 to connect the power pins of components 410 through 440 accordingly. The user may then place additional components or less critical components onto PCB layout 400 as needed (see FIG. 5 and corresponding text for further details).

FIG. 5 is an exemplary diagram depicting a board layout that includes additional components. FIG. 5 shows that components 510 and 520 were added to board layout 400 subsequent to the addition of power shapes 450-470. The shape development program modifies and adds shapes as needed to accommodate the new components. FIG. 5 shows that shape 460 and a portion of shape 470 have increased in thickness (X-Y dimension) to support increased current requirements with the addition of components 510 and 530. In one embodiment, the z-axis of the shape may be increased by moving the shape to a different layer that, per the cross section definition, has a higher conductor thickness (z-axis). In another embodiment, the shape development program may add multiple shapes on multiple layers, and then connect the multiple shapes, to support the current requirement.

Shapes 530 and 577 were also added to supply power to components 510 and 520, respectively. In addition, shape 470 was moved to accommodate the placement of shape 520.

Figure 6:
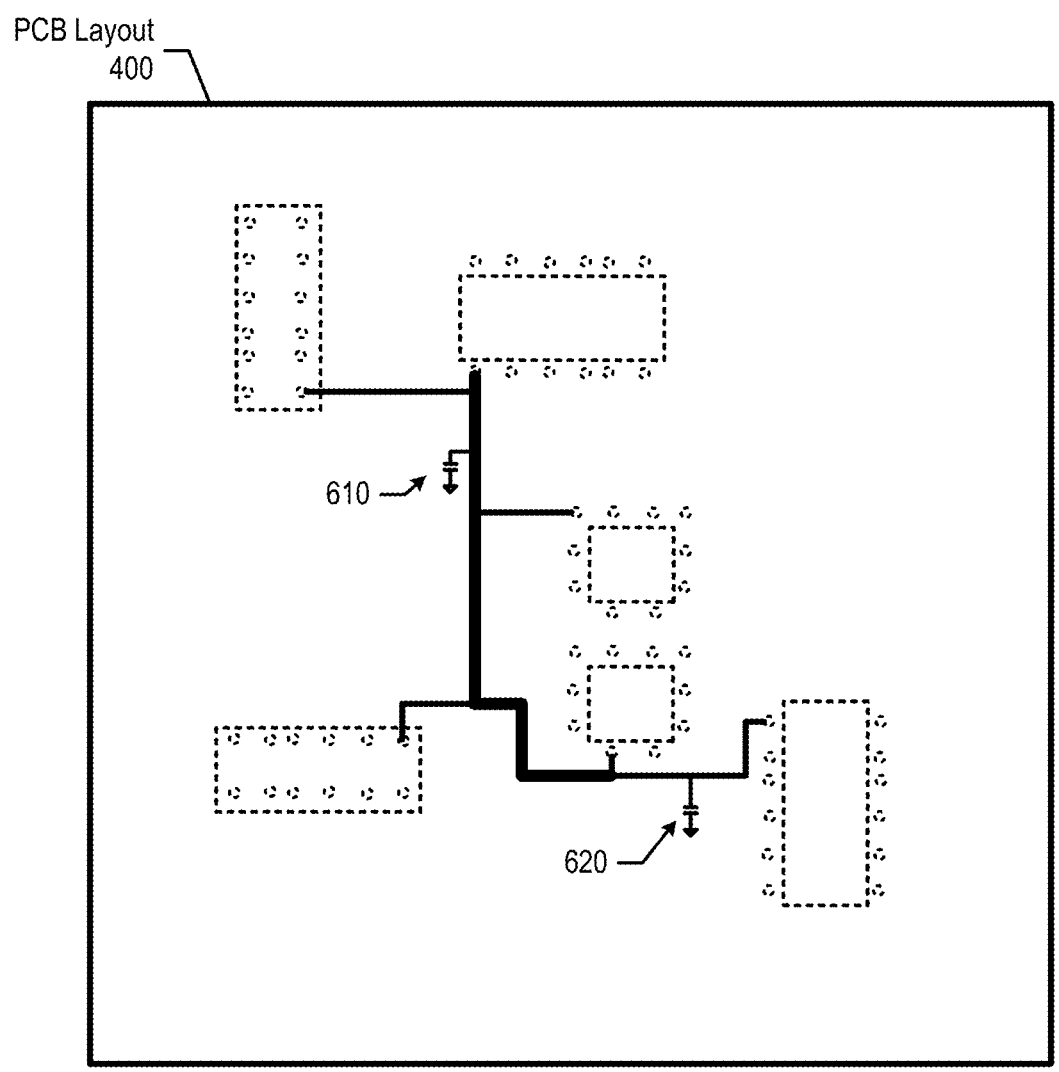
FIG. 6 is an exemplary diagram depicting a board layout that includes EMC capacitors added by a PCB design tool.

FIG. 6 is an exemplary diagram depicting a board layout that includes EMC capacitors added by PCB design tool 340. PCB design tool 340 adds capacitors 610 and 620 to board layout 400 and various locations based on the power shape layouts, power integrity requirements (EMC capacitor requirements), and board design data. In addition, PCB design tool 340 optimally places vias on board layout 400 based on user specified minimum and maximum via sizes as required to join same voltage shapes (e.g., on different board layers) to complete voltage transitions (not shown). In one embodiment, EMC capacitors may be iteratively added or moved based on simulations performed on PCB layout 400.

Figure 7:
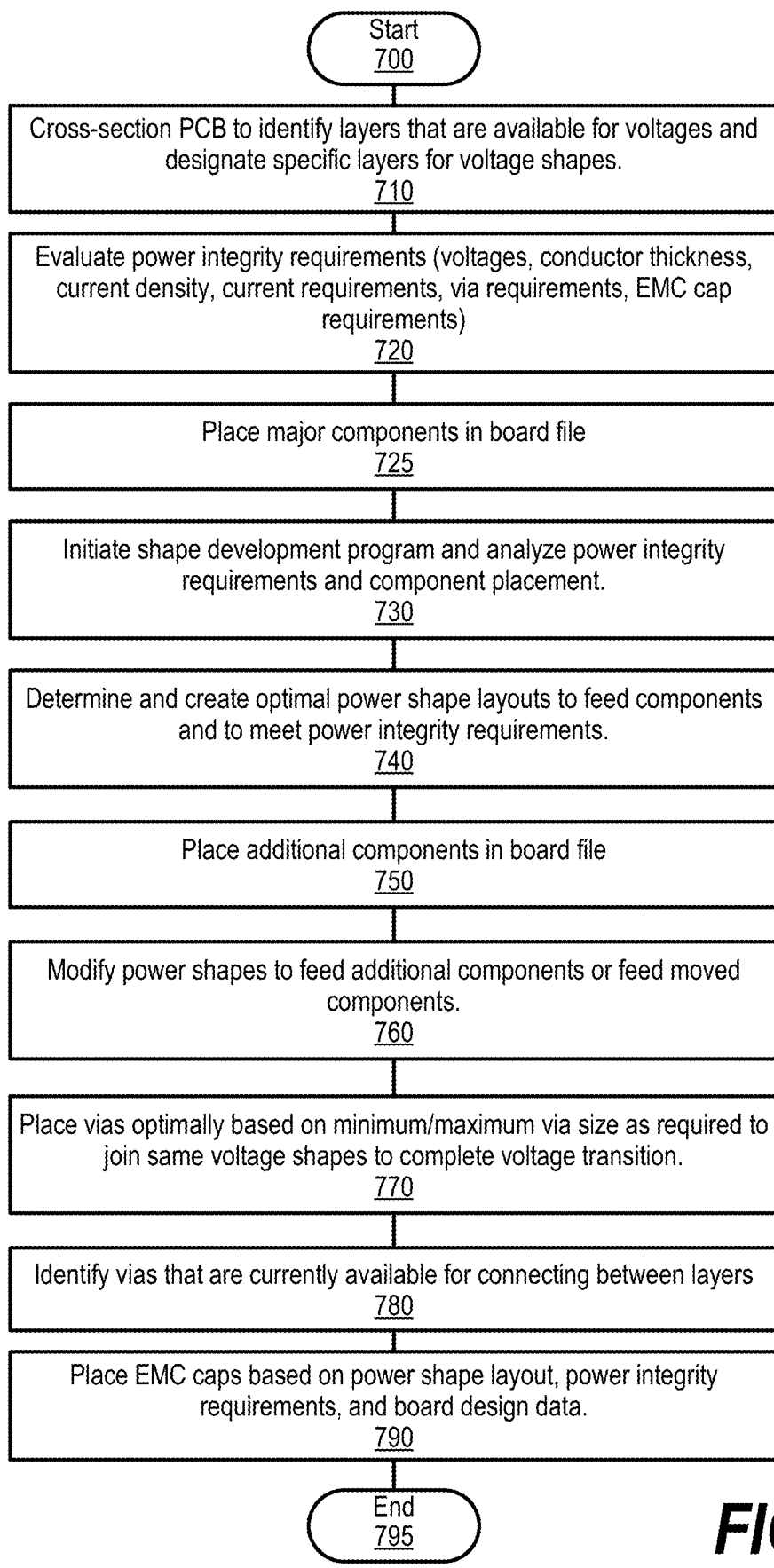
FIG. 7 is an exemplary flowchart depicting steps taken to dynamically modify and simulate power delivery on a printed circuit board.

FIG. 7 is an exemplary flowchart depicting steps taken to dynamically modify and simulate power delivery on a printed circuit board. FIG. 7 processing commences at 700 whereupon, at step 710, the process cross-sections the PCB layout to identify layers that are available for voltages and designates specific layers for voltage shapes. For example, a PCB layout may include conductive layers and non-conductive layers, and the top conductive layers are utilized for signal routing (wiring layers) and the bottom conductive layers are utilized as power layers (voltage and ground).

At step 720, the process evaluates power integrity requirements (voltages, conductor thickness, current density, current requirements, via requirements, EMC capacitor requirements), which may be provided by a user or obtained from a design file. At step 725, the process places major components on a PCB layout. For example, the corresponding electronic design may use three microprocessors, various resistors, clocks, capacitors, etc.

At step 730, the process initiates a shape development program to analyze power integrity requirements and component placement. At step 740, the process creates an optimal power shape layout to feed power to the placed components and to meet the power integrity requirements. Referring to FIG. 4, the process may place components 410 through 440 on PCB layout 400 and generate shapes 450 through 470 to connect the power pins of each of the components.

At step 750, the process places additional components in the board file. For example, a user may add additional components, such as components 510 and 520 shown in FIG. 5. At step 760, the process modifies the current power shapes accordingly to connect the power pins of the components based on the modified PCB layout. This includes moving existing shapes, increasing the size of existing shapes to accommodate increased current requirements, and adding shapes to connect the power pins of new components (see FIG. 5 and corresponding text for further details).

At step 770, the process places vias at optimal locations based on minimum/maximum via size as required to join same voltage shapes to complete the power delivery. For example, layers five, six, and seven may be power layers and the process connects shapes from the various layers using vias to provide appropriate power to each of the placed components. In one embodiment, the circumference of the vias may be based on the current requirements of the components being supplied power. At step 780, the process identifies existing vias that are currently available for connecting between layers.

At step 790, the process places EMC (electromagnetic compatibility) capacitors on the power shapes based on power shape layout, power integrity requirements, and board design data. The EMC capacitors are used to reduce electromagnetic perturbation between components. FIG. 7 processing thereafter ends at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    creating a printed circuit board (PCB) layout based upon a set of packaged components, wherein the PCB layout includes an initial set of power shapes;
    modifying the PCB layout based upon an adjustment of the set of packaged components, wherein the modifying further comprises:
        determining a change in a current requirement based on the adjustment of the set of packaged components; and
        adjusting a size of at least one power shape in the initial set of power shapes in response to the change in the current requirement;
    generating board design data based on the modified PCB layout;
    simulating the modified PCB layout using the board design data; and
    in response to passing the simulating of the modified PCB layout, creating a board layout file based on the modified PCB layout to fabricate the PCB.

2. The method of claim 1 further comprising:
    determining an increase in the current requirement based on the adjustment of the set of packaged components; and
    increasing the size of the at least one power shape in the initial set of power shapes in response to the increase in the current requirement.

3. The method of claim 1 wherein the adjustment of the set of packaged components adds one more additional packaged components, the method further comprising:
    moving a first power shape from a first location in the PCB layout to a second location in the modified PCB layout based upon placement of at least one of the one or more additional packaged components; and
    adding a second power shape to couple the at least one additional packaged component to the first power shape.

4. The method of claim 1 further comprising:
    inserting a set of electromagnetic compatibility (EMC) capacitors into the modified PCB layout based on analyzing the PCB layout and power integrity requirements;
    re-generating the board design data to include the inserted set of EMC capacitors; and
    re-simulating the PCB layout using the re-generated board design data.

5. The method of claim 1 wherein the modified PCB layout includes a set of power shapes, the method further comprising:
    inserting a set of vias into the modified PCB layout to connect the set of power shapes, wherein at least one of the set of power shapes is on a first layer of the modified PCB layout and at least one of the set of power shapes is on a second layer of the modified PCB layout.

6. The method of claim 1 wherein the creating, the modifying, the generating, and the simulating are performed by a single shape development program executing on the information handling system.

7. The method of claim 1 wherein the PCB layout does not correspond to an integrated circuit substrate.

* * * * *